(12) United States Patent
Monton Martin

(10) Patent No.: US 11,773,204 B2
(45) Date of Patent: Oct. 3, 2023

(54) SOLID SURFACE PRODUCT AND PROCESS FOR MANUFACTURING THEREOF

(71) Applicant: Arcesso Dynamics, Sant Fost de Campsentelles (ES)

(72) Inventor: Ernesto Monton Martin, Cunit (ES)

(73) Assignee: Arcesso Dynamics, Sant Fost de Campsentelles (ES)

( * ) Notice: Subject to any disclaimer, the term of this patent is extended or adjusted under 35 U.S.C. 154(b) by 376 days.

(21) Appl. No.: 15/761,880

(22) PCT Filed: Sep. 23, 2016

(86) PCT No.: PCT/ES2016/070667
§ 371 (c)(1),
(2) Date: Mar. 21, 2018

(87) PCT Pub. No.: WO2017/051053
PCT Pub. Date: Mar. 30, 2017

(65) Prior Publication Data
US 2018/0273672 A1    Sep. 27, 2018

(30) Foreign Application Priority Data
Sep. 25, 2015   (EP) .................................... 15382464

(51) Int. Cl.
*C08G 18/32*   (2006.01)
*C08G 18/48*   (2006.01)
(Continued)

(52) U.S. Cl.
CPC ...... *C08G 18/3206* (2013.01); *B29C 45/0001* (2013.01); *B29C 45/40* (2013.01);
(Continued)

(58) Field of Classification Search
CPC .. C08G 18/3206; C08G 18/242; C08G 18/44; C08G 18/4018; C08G 18/6674; C08G 18/73
(Continued)

(56) References Cited

U.S. PATENT DOCUMENTS 5,114,982 A * 5/1992 Mendelsohn .......... C08G 18/10
                                                        521/137
5,244,613 A * 9/1993 Hurley ........................ C08J 9/30
                                                        264/328.1
(Continued)

FOREIGN PATENT DOCUMENTS

EP    2083028 A1    7/2009
EP    2461022 A1    6/2012
(Continued)

OTHER PUBLICATIONS

Bernhardt, Max, "International Search Report," prepared for PCT/ES2016/070667, dated Jan. 23, 2017, four pages.
(Continued)

*Primary Examiner* — Tahseen Khan
(74) *Attorney, Agent, or Firm* — Henry Patent Law Firm LLC

(57) ABSTRACT

The present invention relates to the field of products known as solid surface. In particular, the present invention relates to a precursor liquid composition of a solid surface material, the solid composition formed from said liquid composition and their manufacturing processes.

15 Claims, 2 Drawing Sheets

(51) Int. Cl.

| | |
|---|---|
| *C08G 18/24* | (2006.01) |
| *C08G 18/44* | (2006.01) |
| *C08G 18/66* | (2006.01) |
| *C08G 18/73* | (2006.01) |
| *C08G 18/40* | (2006.01) |
| *C08K 3/22* | (2006.01) |
| *B29C 45/00* | (2006.01) |
| *B29C 45/40* | (2006.01) |
| *B29C 45/72* | (2006.01) |
| *C08J 9/228* | (2006.01) |
| *B29K 75/00* | (2006.01) |

(52) U.S. Cl.
CPC ........ *B29C 45/7207* (2013.01); *C08G 18/242* (2013.01); *C08G 18/246* (2013.01); *C08G 18/4018* (2013.01); *C08G 18/44* (2013.01); *C08G 18/4825* (2013.01); *C08G 18/664* (2013.01); *C08G 18/6674* (2013.01); *C08G 18/73* (2013.01); *C08J 9/228* (2013.01); *C08K 3/22* (2013.01); *B29K 2075/00* (2013.01); *C08G 2110/0025* (2021.01); *C08J 2203/22* (2013.01); *C08J 2205/10* (2013.01); *C08J 2375/04* (2013.01); *C08K 2003/2227* (2013.01)

(58) Field of Classification Search
USPC .......................................................... 428/220
See application file for complete search history.

(56) References Cited

U.S. PATENT DOCUMENTS

| | | | |
|---|---|---|---|
| 7,341,785 B2 | 3/2008 | Kia et al. | |
| 2009/0197000 A1* | 8/2009 | Limerkens | ........... C08G 18/672 |
| | | | 427/340 |
| 2010/0216905 A1* | 8/2010 | Kuwamura | .......... C09D 175/14 |
| | | | 521/170 |
| 2011/0281965 A1* | 11/2011 | Laas | .................... C08G 18/022 |
| | | | 521/137 |

FOREIGN PATENT DOCUMENTS

| | | |
|---|---|---|
| WO | WO-9930882 A1 | 6/1999 |
| WO | WO-2010083958 A1 | 7/2010 |

OTHER PUBLICATIONS

"Plastics—Decorative Solid Surfacing Materials—Part 1: Classification and Specifications (ISO 19712-1:2008)"; NSAI Standards, Feb. 11, 2013, 15 pages.

"Expancel Material Safety Data Sheet", Canada Colors and Chemicals Limited, Apr. 16, 2015, 12 pgs.

"Expancel Microspheres: Your engineered solution", Nouryon Chemicals B.V.; https://www.nouryon.com/document-search/?q=Expancel &ResourcesType=Brochure, 2022, 20 pgs.

* cited by examiner 1A      1B

Figure 2A: with the incorporation of microspheres
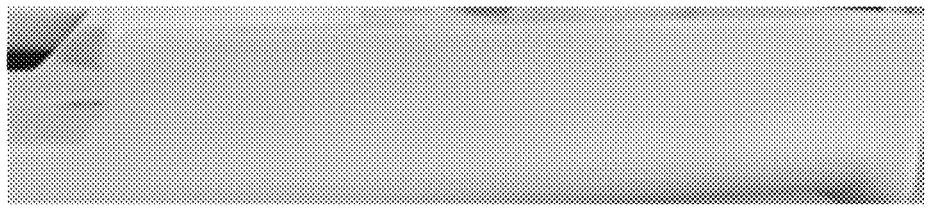
Figure 2B: without the incorporation of microspheres
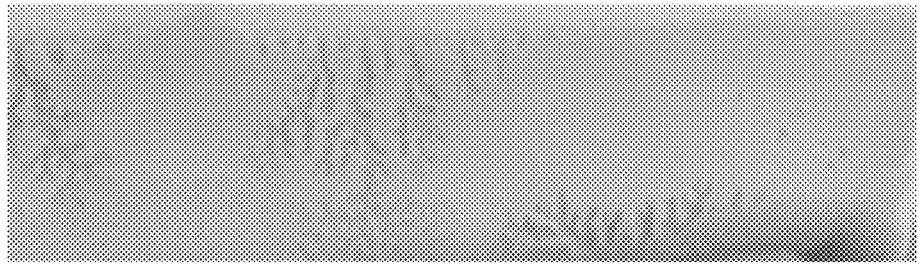

SOLID SURFACE PRODUCT AND PROCESS FOR MANUFACTURING THEREOF

FIELD OF THE INVENTION

The present invention relates to the field of products known as solid surface. In particular, the present invention relates to a precursor liquid composition of a thermosetting, rigid solid surface material, the solid composition formed from said liquid composition and their manufacturing processes.

BACKGROUND OF THE INVENTION

Solid Surface materials are defined as materials formed by a polymer matrix, pigments and fillers that can be processed by sheet shaping or molded products. It is also defined in the ISO Standard 19712-1 UNE.EN: 2013 (see 3.1 for definitions).

The main characteristics of these compounds are:
The material has the same composition throughout the thickness of the sheet or the molded product; it is a homogeneous product.
The sheets and solid surface products are reparable by a simple sanding retaining the original state.
Solid surface products can be joined together continuously by assembly joints which are indiscernible.

Solid surface products have achieved their introduction into the market thanks to its low manufacturing cost and ease of handling (cutting, polishing, obtaining blunt edges, etc.). Advances in composition and manufacturing processes allow to obtain products increasingly rich in texture, color and mineral effects, competing with more traditional products such as natural stone and ceramics.

Among the most widespread applications nowadays those related with bath products and kitchen: toilets, countertops . . . , can be mentioned. Nevertheless, for some time it is also used in other areas, such as indoor design furniture, store windows, offices, shops . . . , as well as in other applications, such as panels or design objects.

Currently solid surface products are constituted by two main types of resins:
Acrylic resins: The resin is chemically a thermoplastic which is finally cured by an activator. It is heated at 60° C. or more. The cured material is then cut into sheets or shapes and polished on one or both sides, depending on the existing brands. Sometimes the material is brought to 160° C. and cooled, to improve heat resistance.
Isophthalic resins of unsaturated polyester containing methyl methacrylate in its composition. The acrylic-modified polyester solid surface can be injected into molds to produce various solid decorative design figures.

The major component of these products are the introduced fillers, mainly alumina trihydrate, but we can also find solid surface products with different percentages of "marble chips" (crushed marble) and quartz. Other fillers used in lower proportion in the manufacture of solid surface products are titanium dioxide, onyx, calcium carbonate and titanium dioxide. In addition, to the mixture different ratios of wetting and air release additives are added.

Typically a solid surface product must itself have a very high resistance to UV light, since if it is intended to give protection via coating (another layer of another product), either with paint, varnish, metal, etc. . . . would no longer be a solid surface material by definition.

However, there are solid surface products where that resistance to UV light is low, in addition to other important issues such as low resistance to chemicals, low impact resistance and a high specific gravity (for example, Corian-type solid surfaces have a density of 1750 kg/m$^3$).

The present invention aims to manufacture solid surface products that improve the existing ones made from chemically different resins. In particular polyurethane-based formulations have been developed. Polyurethane resins are an important advantage from the point of view of the production process (reduced cycle times) and the final product (reduced weight, improved impact properties and allows a greater versatility of design). Additionally, the polyurethane resins of the present invention may partly been originated from biomass, which is an important advantage from the environmental point of view. The products described herein are polyurethanes which are thermosetting, rigid, opaque or slightly translucent, compact or partially expanded while retaining solid areas. Therefore, those polymers which are of thermoplastic, elastomers, with flexible properties and optically transparent.

The use of polyurethane resins in the manufacture of solid surface products is not currently used but these resins are an important advantage from the point of view of the production process and the final product. However, the use of polyurethane formulations presents a considerable disadvantage, it is necessary to use a coating (gel coat or top coat) to prevent the so called "yellowing" of the workpiece. In polyurethane formulations for solid surface products, aromatic isocyanates which produce side reactions leading to the formation of aromatic amines are employed. UV radiation causes oxidation of these aromatic amines forming quinones. Quinones are yellow and, as part of the polymer chain, provide this color tone to polyurethane. Over time, the oxidation process is accelerated, causing what is referred as "yellowing" of the polyurethane. Consequently, workpieces made with aromatic isocyanates require a finish with an opaque coating which gives them a protective layer against ultraviolet (UV) light, preventing oxidation of the aromatic amines and therefore the "yellowing" of the piece. Quinones are formed when aromatic isocyanates are used in the formulation.

The present inventors have found that aliphatic isocyanates currently used exclusively in coating formulations, adhesives y transparent pieces, allow to obtain polyurethanes which will not fade and by a suitable process, solid surface products which do not require a coating layer for protection against ultraviolet radiation can be manufactured.

Additionally, in order to obtain a suitable productive yield of polyurethane-based pieces, the reaction of the components is induced as quickly as possible. This reaction from a physical aspect is the transition from liquid to solid. That is, there is a change in density. This rapid change in the matter generates a shrinkage effect or a decrease in the volume that will be greater as the volume of the piece is greater, which inevitably involves visible defects such as sink marks in branched form on the surface of the polyurethane-based solid pieces, which may not be admissible in a piece manufactured as shown in the standards UNE.EN ISO 19712-1: 2013 of solid surface materials.

The present inventors have found that the addition of expandable polymeric microspheres helps to counteract this change in density and therefore surface marks that occur in the production of solid pieces are avoided, while maintaining the reaction rate.

It has even shown that when adding a greater amount of microspheres, the structure of the already crosslinked polyurethane solid can have two distinctly different densities: a compact density greater than 1100 g/cm³, typical for "Solid Surface" products with a sheet thickness of 2 to 5 mm in the outer part and a low or medium density of 200 to 800 g/cm³, in the inner part or core. This feature makes the piece have a sandwich type structure which provides very improved physical properties such as, for example, good resistance to breakage and impact, with a lower final weight of the piece.

SUMMARY OF THE INVENTION

In a first aspect, the present invention relates to a precursor liquid composition of a thermosetting rigid solid surface material comprising aliphatic- or cycloaliphatic-type isocyanate, polyol which can have a renewable source or biomass origin and expandable polymeric microspheres.

In a second aspect, the present invention relates to a solid composition formed from the liquid composition of the first aspect.

In a third aspect, the present invention relates to the process for obtaining the liquid composition of the first aspect.

In a fourth aspect, the present invention relates to the process for obtaining the solid composition of the second aspect.

BRIEF DESCRIPTION OF THE DRAWINGS

FIG. 2 shows (A) a compact piece of single density, which is greater than 1200 g/cm³, with the typical sink marks in branched form and (B) another image of the same type of piece but without these sink marks after having incorporated in the production process expanded polymeric microspheres with hydrocarbon.

DETAILED DESCRIPTION OF THE INVENTION

Figure 1A:
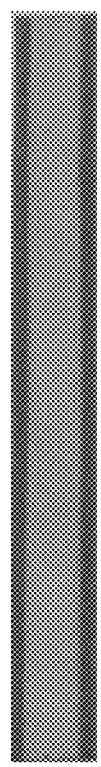
FIGS. 1 (1A and 1B) shows two sandwich-type structures as described in the present invention with a compact density greater than 1100 g/cm³, typical for "Solid Surface" products with a sheet thickness of 2 to 5 mm in the outer part and a low or medium density of 200 to 800 g/cm³, in the inner part or core.
Figure 1B:
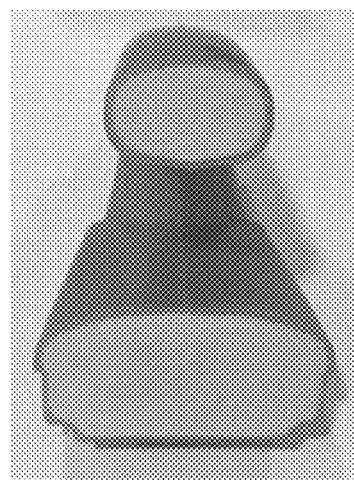

In a first aspect, the present invention relates to a precursor liquid composition of a thermosetting, rigid solid surface material comprising at least one polyol, optionally from a renewable source or biomass origin, at least one metal-based catalyst, at least one cycloaliphatic- or aliphatic-type isocyanate and expandable polymeric microspheres, preferably filled with hydrocarbon gas.

In a particular embodiment, the precursor liquid composition of a rigid solid surface material described above is characterized in that in addition to said at least one polyol, said at least one catalyst and said polymeric microspheres, comprises only one aliphatic- or cycloaliphatic-type isocyanate.

The thermosetting polyurethanes are those that change irreversibly under the influence of heat, light, photochemical agents and chemical agents, passing from a fusible and soluble material to another infusible and insoluble material, by forming a three dimensional covalent lattice, while thermoplastic polyurethanes are linear elastomeric polymers, whose chains are stretched by heat reaching, with higher or lower viscosity, to the liquid phase, which is reversible when the temperature drops.

Polyurethane resins are generally formulated by a group of polyols of several types (based on polyether, polyester, polycarbonate, etc. . . . ) with their corresponding activators, which are usually amine-type activators and other additives depending on the application of the final product. The addition of almost any type of additive is possible. All of these are usually gathered into a single component, commonly called Component A. The reaction of this component A with component B (which are the isocyanates) produces the polymer called polyurethane.

Polyurethanes polymerize by polyaddition reactions. The common structural element of all these polymers is the urethane group (—NH—CO—O). The properties of polyurethanes can be controlled by a proper design of the molecular structure and composition of their constituents.

Depending on the properties of the final product, the polyurethane formulation includes various types of polyol, usually polyester and polyether, different types of isocyanate and various additives.

Isocyanate Component

Isocyanates with two or more NCO groups in the molecule are required to form polyurethanes. Aromatic, aliphatic and cycloaliphatic di- and polyisocyanates are suitable for the chemistry for forming polyurethanes. Aromatic polyurethanes are the most commonly used because their urethane groups are more reactive than in the case of aliphatic and are also much cheaper.

The present invention relates only to aliphatic or cycloaliphatic isocyanates. In particular, such cycloaliphatic- or aliphatic-type isocyanates are 1,6-hexane diisocyanate (HDI), dicyclohexylmethane-4,4'-diisocyanate (H12MDI), isophorone diisocyanate (IPDI), 2,2,4-trimethyl-hexamethylene diisocyanate (TMDI), pentamethylene diisocyanate (PDI) or a combination thereof.

Polyol Component

Compounds with several hydroxyl functional groups in the molecule are together with isocyanates the major components in the polyurethane formulation. Low molecular weight compounds such as ethylene glycol, glycerol, butanediol, trimethylolpropane, etc. . . . act as crosslinking agents or chain extenders. Polyols with higher molecular weight (average molecular weight up to 8000) are those which act as basis for polyurethane formation. These high molecular weight polyols are mainly constituted by two kind of products: polyether and polyester. In addition, and more recent, polycarbonate-based polyols can also be mentioned. The latter provide an increased durability of the final product due to the presence of the carbonate group, and an increased chemical, thermal and UV resistance. Other types of polyurethanes can be prepared using other macroglycols, such as a polyolefin glycol, a polyesteramide glycol, a polycaprolactone glycol, an amine-terminated macroglycol or a polyacrylate glycol. Similarly, polyols having a functionality greater than 2 can be used.

In the present invention, a polyether, a polyester, a polycarbonate-based polyol or a macroglycol-based polyol, or a combination thereof is preferably used as the polyol, more preferably a macrodiol of trifunctional polyether type with OH number from 300 to 950 or a polycarbonate-based polyol of OH number from 120 to 260.

Additionally, a polyol from a renewable source or biomass origin can be used, such as those whose origin is castor oil, rapeseed oil, soybean oil and sunflower oil. These polyols are typically of high cost and are often linked to other polyols typically originated from hydrocarbons (fossil origin), so that they are strictly polyols partially originated from renewable sources or biomass.

There are also polyols originated from renewable sources that, although being synthesized by chemical processes, do not lose their condition of polyols proceeding from biomass, such as butanediol and propanediol, both originated from sugar cane. Likewise, glycerol, 1,2,3-propanetriol, can also be considered as a suitable polyol for producing polyurethane as it is an alcohol having three OH groups reacting in the presence of isocyanates. Currently glycerol is obtained from various sources, such as fatty oils and natural oils, as well as a byproduct of biodiesel production.

The present inventors have found that the use of these polyols originated from a renewable source or biomass, besides being advantageous for the environment, also increase the physical yields of the resulting solid surface pieces.

Catalyst Component:

The catalyst components necessary for the reaction are basically metal salts, such as, for example, dibutyl tin dilaurate (DBTL), zinc neodecanoate, bismuth carboxylate, or a combination thereof. Optionally, these catalyst components can be combined with amine-based catalysts.

Additive Component

There is a variety of additives which can be used in the polyurethane formulation. The use of these additives is desirable in some cases, being necessary in other cases for the polymerization reaction to be carried out or for obtaining specific properties of the final product.

The additives used in the polyurethane formulation depend on the transformation process and the type of polyurethane. Among the additives which can be used in the present invention, for example, stabilizers, foaming agents, flame retarding agents and compounds protecting the polyurethane against hydrolytic degradation, oxidation or ultraviolet light, fillers (from plant and/or mineral origin, and optionally also micronized) or pigments, can be mentioned. In addition to the above additives, nowadays different types of nanoparticles incorporated into the polymer matrix to achieve specific properties are also employed and are also considered in the present invention. Nanoparticles are particles ranging in size from 1 to 100 nm.

In the polyurethane formulation of the present invention, the addition of expandable polymeric microspheres, which can filled or empty, preferably filled with hydrocarbon gas, is necessary and generate a type of expansion to obtain a type of solid which is in agreement with the definition of Solid Surface according to the standard specified above. Preferably, these microspheres are in a percentage of at least 0.1% wt with respect to the final composition and at most 18% wt with respect to the final composition.

The thermoplastic cover of the expandable polymeric microspheres may consist of, for example, polymers or copolymers that have been polymerized from monomers such as vinyl chloride, vinylidene chloride, acrylonitrile, methyl methacrylate or styrene, or mixtures thereof. The particle size of unexpanded spheres, and thus that of the expanded spheres, can vary within wide ranges and these are selected depending on the desired properties on the final product. As examples of particle sizes of unexpanded microspheres, mention is made from 1 micron to 1 mm, preferably from 2 µm to 0.5 mm, and especially from 5 µm to 50 µm. After expansion, the diameter of the microspheres increases by a factor of 2 to 5. The unexpanded microspheres can be empty or can contain blowing agents which are volatile liquids which are aerated by supplying heat. When heat is supplied, the polymer cover is softened and the microspheres expand when the blowing agent is aerated. The blowing agents may consist of freons such as trichlorofluoromethane, hydrocarbons such as n-pentane, i-pentane, neopentane, butane, i-butane or other blowing agents conventionally employed in microspheres of the type used herein. The blowing agent preferably constitutes 5-30% wt of the weight of the microsphere. An example of a suitable preferred and commercially available microsphere product is Expancel (trademark) having a thermoplastic cover of a vinylidene chloride copolymer/acrylonitrile and isobutane as blowing agent.

In a particular case, it has been shown that when adding more thermoplastic expandable microspheres, at least 3% wt over the whole amount of the final composition, the structure of the already crosslinked polyurethane solid can have two distinctly different densities: a compact density greater than 1100 $g/cm^3$, typical for "Solid Surface" products with a sheet thickness of 2 to 5 mm in the outer part and a low or medium density of 200 to 800 $g/cm^3$, in the inner part or core. This feature makes the piece have a sandwich type structure which provides very improved physical properties such as, for example, good resistance to breakage and impact, with a lower final weight of the piece.

In a further embodiment, the already manufactured polyurethane can be even added as a further additive, which is micronized and incorporated into the polyurethane formulation of the present invention being manufactured. Thus, the polyurethane of the present invention as obtained and, due to their particular characteristics, is not to be used, can be micronized and incorporated into another polyurethane formulation according to the invention. Accordingly, the polyurethane obtained according to the invention can always be reusable and therefore is recyclable.

The liquid composition of the present invention preferably comprises the polyol as defined above in an amount between 4% and 20% by weight in the final composition.

The liquid composition of the present invention preferably comprises the aliphatic or cycloaliphatic isocyanate as defined above in an amount between 7% and 75% by weight in the final composition.

The liquid composition of the present invention preferably comprises the catalyst as defined above in an amount between 0.1% and 2% by weight in the final composition.

As indicated above, the liquid composition of the present invention may comprise additives which are not expandable polymeric microspheres, and can be present between 2% and 85% by weight relative to the final total composition, as long as the 100% is not exceeded, i.e. if additives represent the 85%, the other components will not amount more than 15%.

In a second aspect, the present invention relates to a solid composition (solid surface product) which is thermosetting and is formed from the liquid composition as defined in the various embodiments of the present invention.

In a third aspect, the present invention relates to a process for obtaining the liquid composition as defined in the various embodiments of the present invention, comprising the steps of:

(a) mixing said at least one polyol with said at least one catalyst and the expandable polymeric microspheres, optionally with said at least one additive;

(b) mixing the product obtained in (a) with said at least one aliphatic- or cycloaliphatic-type isocyanate.

Preferably, the mixtures in the steps (a) and (b) are performed at a temperature between 25 and 50° C.

In a fourth aspect, the present invention relates to a process for obtaining the solid composition (solid surface product), as defined in the various embodiments of the present invention, comprising the steps of:

(a) obtaining the liquid composition according to the third aspect of the invention;
(b) introducing said liquid composition into a mold;
(c) curing the product in the mold;
(d) unmolding the product once solid.

Preferably, the mold is at a temperature between 25 and 80° C.

The present invention will be described by examples which only intend to illustrate the invention without limiting it in any way.

EXAMPLES

General Example

1. Employed Products
Polyols:

Trifunctional polyether-type macrodiols with OH number from 300 to 950, polycarbonate-based polyols with OH number from 120 to 260 were used. Likewise polyols proceeding from renewable sources such as 1,3-propanediol, 1,4-butanediol, 1,2,3-propanetriol and 1,5-pentanediol were also used.
Isocyanates:

The aliphatic-type diisocyanates 1,6-hexane diisocyanate (HDI), dicyclohexylmethane-4,4'-diisocyanate (H12MDI), isophorone diisocyanate (IPDI), 2,2,4-trimethyl-hexamethylene diisocyanate (TMDI) and pentamethylene diisocyanate (PDI) were used.
Catalyst: dibutyl tin dilaurate (DBTL) and bismuth carboxylate.
Additives:
Bubble removing agents (anti-foaming agents).
Air-release agents
Wetting and dispersing agents, for example solutions of alkylammonium salt having hydroxylated groups of acid copolymer
Moisture inhibitor agents, for example zeolites
Flame retarding agents, for example ammonium triphosphate and triethyl phosphate
Agents for pigmentation, for example titanium dioxide ($TiO_2$) and inorganic dye concentrates mixed with polyols.

Inorganic fillers, such as alumina (aluminum oxide trihydrate), barite, quartz, glass microspheres Polymeric fillers, for example crushed and micronized polyurethanes, polystyrenes, polyethylenes and empty and/or hydrocarbon filled polymeric microespheres.

Organic fillers, for example plant fibers, crushed and/or micronized agricultural and forestry by-products.

The various components were chosen based on the following criteria:
Material processability: viscosity
Mechanical properties: Impact and thermal resistance
Appearance: color, surface uniformity
Maintenance of color in indoor and outdoor places. UV resistance.

The product formulation is based on a stoichiometric ratio of the polyol mixture with the corresponding additives, and the aliphatic or cycloaliphatic isocyanates.

The range of components ratio was as follows provided that the sum is 100%:
Polyols (polyether polyol/polycarbonate-based polyol/chain extender) between 4% and 20% by weight
Catalysts for the reaction: between 0.1% and 2% by weight
Additives: between 2% and 85% by weight
Expandable polymeric microspheres: from 0.1% by weight Aliphatic or cycloaliphatic isocyanates: between 7% and 75% by weight 2. Introduction of the Mixture into a Mold:

After preparing the formulation, the component A (polyols+catalyst, microspheres, additives) is mixed with component B (aliphatic cycloaliphatic isocyanate), and introduced into a mold. The mold should be with heat at a temperature between 250 and 80° C., and preferably having previously vacuum sealed.

3. Product Curing in the Mold by Applying Heat

The material reacts in the mold which was previously heated passing from liquid to solid. The reaction can last from 5 minutes to 60 minutes being this the time for curing.

4. Unmolding the Material with its Already Solid Form:

The mold piece is removed from the mold. The piece obtained by this process has taken the form of the mold, allowing to obtain finished pieces.

Example 1

A mixture with Component A and component B is performed as follows:

Firstly component A (polyol, additives, microspheres and catalysts) is formulated. Once component A is obtained is then mixed by stirring for 20 s with Component B (exclusively isocyanates) at a temperature of 35° C.

The materials as shown below are mixed by stirring for 20 minutes at a temperature between 25 and 30° C.:

| MATERIALS | NAME | % | | % over/A + B |
|---|---|---|---|---|
| | | | No. OH | |
| POLYOL | | 100 | | |
| Polyol 1 | Polyether polyol | 80 | 805 | 15.35 |
| Polyol 2 | Polyether polyol | 15 | 400 | 2.88 |
| Polyol 3 | 1,4-Butanediol | 5 | 1245 | 0.96 |
| ADDITIVES | | % over/ polyol | | |
| additive | Zeolite | 20 | | 3.84 |
| additive | Titanium dioxide | 26 | | 4.99 |
| additive | Micronized alumina | 120 | | 23.02 |
| additive | Polymeric microspheres | 3 | | 0.58 |
| CATALYSTS | | | | |
| Catalyst | DBTL | 0.7 | | 0.13 |
| | | | No. NCO | |
| ISOCYANATE | | 100 | | |
| Iso | HDI | 100 | 22.8 | 48.26 |
| A + B | | | | 100.00 |

The mixture is poured or injected (component A+component B) into a mold which has been previously heated at 45° C. Prior to the injection of the mixture a release agent to act as a mold release agent has been applied to the mold.

Once the material is injected and after a curing time of 30 minutes, the mold is opened and the finished piece is removed. A cleaning work can be applied subsequently for removing the surplus of material and for removing possible marks by polishing. The result is a piece with the shape of the mold cavity, solid, rigid, opaque, with the characteristics of a solid surface-type piece with a density of approximately 1.3 kg/m$^3$ and resistant to UV radiation.

Example 2

A mixture with Component A and component B is performed as follows (where A and B are as shown in example 1):

Firstly component A is formulated. Once component A is obtained is then mixed by stirring for 30 s with Component B at a temperature of 40° C.

The materials as shown below are mixed by stirring for 20 minutes at a temperature of 25° C.:

| MATERIALS | NAME | % | | % over/A + B |
|---|---|---|---|---|
| | | | No. OH | |
| POLYOL | | 100 | | |
| Polyol 1 | Polyether polyol | 80 | 805 | 20.86 |
| Polyol 2 | Polycarbonate diol | 15 | 200 | 3.91 |
| Polyol 3 | 1,4-Butanediol | 5 | 1245 | 1.30 |
| ADDITIVES | | % over/polyol | | |
| additive 7 | Zeolite | 10 | | 2.61 |
| additive 9 | Micronized alumina | 30 | | 7.82 |
| additive 10 | Polymeric microspheres | 1 | | 0.26 |
| CATALYSTS | | | | |
| Catalyst 1 | DBTL | 0.7 | | 0.18 |
| | | | No. NCO | |
| ISOCYANATE | | 100 | | |
| Iso 1 | HDI | 100 | 22.8 | 63.05 |
| A + B | | | | 100.00 |

The mixture is poured or injected (component A+component B) into a mold which has been previously heated at 45° C. Prior to the injection of the mixture a release agent to act as a mold release agent has been applied to the mold.

Once the material is injected and after a curing time of 35 minutes, the mold is opened and the finished piece is removed. A cleaning work can be applied subsequently for removing the surplus of material and for removing possible marks by polishing. The result is a piece with the shape of the mold cavity, solid, rigid, semi-translucent, with the characteristics of a solid surface-type piece with a density of approximately 1.1 kg/m$^3$ and resistant to UV radiation.

Example 3

A mixture with Component A and component B is performed as follows (where A and B are as shown in example 1):

Firstly component A is formulated. Once component A is obtained is then mixed by stirring for 20 s with Component B at a temperature of 35° C.

The materials as shown below are mixed by stirring for 20 minutes at a temperature of 25° C.:

| MATERIALS | NAME | % | | % over/A + B |
|---|---|---|---|---|
| | | | No. OH | |
| POLYOL | | 100 | | |
| Polyol 1 | 1,2,3-propanetriol | 100 | 1826 | 10.23 |
| ADDITIVES | | % over/polyol | | |
| additive 7 | Polymeric microspheres | 3 | | 0.31 |
| additive 8 | Zeolite | 5 | | 0.51 |
| additive 9 | Titanium dioxide | 20 | | 2.05 |
| additive 10 | Micronized polyurethane | 300 | | 30.68 |
| CATALYSTS | | | | |
| Catalyst 1 | DBTL | 0.7 | | 0.07 |
| | | | No. NCO | |
| ISOCYANATE | | 100 | | |
| Iso 1 | PDI | 100 | 24.9 | 56.15 |
| A + B | | | | 100.00 |

The mixture is poured or injected (component A+component B) into a mold which has been previously heated at 45° C. Prior to the injection of the mixture a release agent to act as a mold release agent has been applied to the mold.

Once the material is injected and after a curing time of 30 minutes, the mold is opened and the finished piece is removed. A cleaning work can be applied subsequently for removing the surplus of material and for removing possible marks by polishing. The result is a piece with the shape of the mold cavity, solid, rigid, opaque, with the characteristics of a solid surface-type piece with a density of approximately 1.3 kg/m$^3$ and resistant to UV radiation, without defects on the surface and which materials proceed from a renewable source or biomass in more than 50% with respect of the total composition.

Example 4

A mixture with Component A and component B is performed as follows (where A and B are as shown in example 1):

Firstly component A is formulated. Then component B is formulated.

Once component A and component B are individually obtained, they are mixed by stirring for 20 s at a temperature of 35° C.

The materials as shown below are mixed by stirring for 20 minutes at a temperature of 25° C.:

| MATERIALS | NAME | % | | % over/A + B |
|---|---|---|---|---|
| | | | No. OH | |
| POLYOL | | 100 | | |
| Polyol 1 | Polyether polyol | 100 | 935 | 21.86 |
| ADDITIVES | | % over/polyol | | |
| additive 7 | Polymeric microspheres | 25 | | 5.46 |
| additive 8 | Zeolite | 5 | | 1.09 |
| additive 9 | Titanium dioxide | 40 | | 8.74 |
| CATALYSTS | | | | |
| Catalyst 1 | Bismuth carboxylate | 0.32 | | 0.07 |
| | | | No. NCO | |
| ISOCYANATE | | 100 | | |
| Iso 1 | HDI | 25 | 22.8 | 15.69 |
| Iso 2 | PDI | 75 | 24.9 | 47.08 |
| A + B | | | | 100.00 |

The mixture is poured or injected (component A+component B) into a mold which has been previously heated at 45°

C. Prior to the injection of the mixture a release agent to act as a mold release agent has been applied to the mold.

Once the material is injected and after a curing time of 30 minutes, the mold is opened and the finished piece is removed. A cleaning work can be applied subsequently for removing the surplus of material and for removing possible marks by polishing. The result is a piece with the shape of the mold cavity, solid, rigid, opaque, with the characteristics of a solid surface-type piece resistant to UV radiation with a density of approximately 1.3 kg/m$^3$ in the outer part and about 2 mm thick and with another density in the inner part or core of about 0.500 kg/m$^3$.

Example 5: Impact Test and Deformation Test by Heat Under Load

Impact test according to the Charpy test and deformation test by heat under load were conducted in two solid samples with the same chemical composition and prepared in the same way, with the only difference of the polymeric microspheres, and substantially higher values were obtained in the samples with expanded structure obtained with a bi-density (sandwich) compared to those of expanded structure of a single density (standard):

|  | Standard | Bi-density |
| --- | --- | --- |
| Piece density g/cm$^3$ | 700 | 700 |
| Test specimen thickness | 10.2 | 10.2 |
| Test specimen width | 10.2 | 10.2 |
| Absorbed energy | 1.71 | 2.48 |
| Impact resistance KJ/m$^2$ (1) | 16.4 | 22.5 |
| Deformation under load (2) |  |  |
| at 60° C. | 0.1 | 0.2 |
| at 75° C. | 0.7 | 0.4 |
| at 90° C. | 1.5 | 0.9 |
| Permanent deformation at 90° C. | 2.3 | 1.2 |

(1) The higher the value, the higher impact resistance
(2) The ower the value, the higher resistance to deformation by temperature The test specimen with bi-density had an outer density of 1000 g/cm$^3$ with an average thickness of 2.5 mm and an inner density of 412 g/cm$^3$ with a thickness of 5.2 mm.

For the test specimen with bi-density a combination of hydrocarbon gas-filled polymeric microspheres and an additional expanding gas were used as an expanding agent.

For standard specimen water was used as an expanding agent.

The invention claimed is:

1. A thermosetting homogenous solid surface material defined by standard UNE.EN ISO 19712-1:2013, the thermosetting homogenous solid surface formed from a liquid composition comprising:
    at least one polyol;
    at least one metal-based catalyst;
    at least one aliphatic-type isocyanate or cycloaliphatic-type isocyanate;
    unexpanded polymeric microspheres present in the liquid composition in an amount of 3% by weight, wherein the unexpanded polymeric microspheres have a diameter in a partially expanded state that is 2 to 5 times that of the unexpanded state, the unexpanded polymeric microspheres having a diameter of approximately 5 μm to approximately 50 μm;
    wherein the polyol in the liquid composition is a polyether, a polyester, a polycarbonate-based polyol or a macroglycol-based polyol, or a combination thereof, and the polyol is present between 4% and 20% by weight in the composition; and
    wherein, when heat is applied to the liquid composition, the unexpanded polymeric microspheres partially expand such that the liquid composition forms the thermosetting homogenous solid surface; and
    wherein the thermosetting homogenous solid surface comprises a sandwich structure with a sheet thickness from 2 to 5 mm in an outer part and a density of at least 1000 g/cm$^3$ and an inner part with a density in the range of 200 to 800 g/cm$^3$.

2. The liquid composition for forming the thermosetting homogenous solid surface material according to claim 1, wherein the liquid composition further comprises at least one additive selected from the group consisting of: stabilizers, foaming agents, flame retarding agents, agents protecting against hydrolytic degradation, agents protecting against oxidation, agents protecting against ultraviolet light, fillers, pigments and nanoparticles.

3. The liquid composition for forming the thermosetting homogenous solid surface material according to claim 1, wherein the aliphatic-type isocyanate in the liquid composition is 1,6-hexane diisocyanate (HDI), dicyclohexylmethane-4,4'-diisocyanate (H12MDI), isophorone diisocyanate (IPDI), 2,2,4-trimethyl-hexamethylene diisocyanate (TMDI), pentamethylene diisocyanate (PDI) or a combination thereof.

4. The liquid composition for forming the thermosetting homogenous solid surface material according to claim 1, wherein the polyol has a renewable source or biomass origin.

5. The liquid composition for forming the thermosetting homogenous solid surface material according to claim 1, wherein the catalyst in the liquid composition is dibutyl tin dilaurate (DBTL), zinc neodecanoate or bismuth carboxylate, or a combination thereof.

6. The liquid composition for forming the thermosetting homogenous solid surface material according to claim 1, wherein the liquid composition further comprises micronized polyurethane.

7. The liquid composition for forming the thermosetting homogenous solid surface material according to claim 1, wherein the aliphatic-type isocyanate in the liquid composition is present between 7% and 75% by weight in the composition.

8. The liquid composition for forming the thermosetting homogenous solid surface material according to claim 1, wherein the catalyst in the liquid composition is present between 0.1 and 2% by weight in the composition.

9. The liquid composition for forming the thermosetting homogenous solid surface material according to claim 2, wherein the at least one additive in the liquid composition is present between 2% and 85% by weight in the composition, as long as 100% of all components is not exceeded.

10. The liquid composition for forming the thermosetting homogenous solid surface material according to claim 1, wherein the unexpanded polymeric microspheres in the liquid composition are present in at least 0.1% by weight in the composition.

11. The liquid composition for forming the thermosetting homogenous solid surface material according to claim 1, wherein the unexpanded polymeric microspheres in the liquid composition are filled with hydrocarbon gas.

12. The liquid composition for forming the thermosetting homogenous solid surface material according to claim 1, wherein the unexpanded polymeric microspheres in the liquid composition are present from 3% by weight in the composition.

13. A process for obtaining the thermosetting homogenous solid surface material according to claim 1, the process comprising the steps of:
  (a) obtaining a liquid composition, the obtaining comprising the steps of:
    (a1) mixing at least one polyol with at least one catalyst and unexpanded polymeric microspheres, optionally with at least one additive; and
    (a2) mixing a product obtained in (a1) with at least one aliphatic-type isocyanate or cycloaliphatic-type isocyanate;
  (b) introducing the liquid composition into a mold;
  (c) curing the product in the mold; and
  (d) unmolding the product once solid.

14. The process according to claim 13, wherein the mixtures in steps (a1) and (a2) are performed at a temperature between 25 and 50° C.

15. The process according to claim 13, wherein the mold is at a temperature between 25 and 80° C.

* * * * *